United States Patent [19]

Taki

[11] Patent Number: 4,922,454

[45] Date of Patent: May 1, 1990

[54] MAGNETO-OPTICAL MEMORY MEDIUM AND APPARATUS FOR WRITING AND READING INFORMATION ON AND FROM THE MEDIUM

[75] Inventor: Kazunari Taki, Nagoya, Japan

[73] Assignee: Brother Kogyo Kabushiki Kaisha, Nagoya, Japan

[21] Appl. No.: 792,591

[22] Filed: Oct. 29, 1985

[30] Foreign Application Priority Data

| Oct. 30, 1984 | [JP] | Japan | 59-228741 |
| Oct. 30, 1984 | [JP] | Japan | 59-228742 |
| Oct. 30, 1984 | [JP] | Japan | 59-228743 |
| Oct. 30, 1984 | [JP] | Japan | 59-228744 |

[51] Int. Cl.$^5$ .......................................... G11C 13/06
[52] U.S. Cl. ...................... 365/122; 360/59; 369/13
[58] Field of Search ............... 365/122; 360/59; 369/13; 428/694, 900

[56] References Cited

U.S. PATENT DOCUMENTS

| 3,235,672 | 2/1966 | Beguin | 369/121 |
| 3,650,601 | 3/1972 | Bierlein | 365/122 |
| 3,665,483 | 5/1972 | Becker et al. | 346/1.1 |
| 3,781,905 | 12/1973 | Bernal et al. | 365/122 |
| 4,219,704 | 8/1980 | Russell | 369/108 |
| 4,546,463 | 10/1985 | Opheij et al. | 369/110 |
| 4,559,573 | 12/1985 | Tanaka et al. | 365/122 |
| 4,612,587 | 9/1986 | Kaneko et al. | 360/114 |
| 4,631,617 | 12/1986 | Tanaka et al. | 428/694 |
| 4,660,190 | 4/1987 | Fujii et al. | 369/13 |
| 4,670,865 | 6/1987 | Hatano | 360/59 |

FOREIGN PATENT DOCUMENTS

| 56-68937 | 6/1981 | Japan . |
| 58-125244 | 7/1983 | Japan . |
| 58-150146 | 9/1983 | Japan . |
| 61-107553 | 5/1986 | Japan . |

OTHER PUBLICATIONS

IBM Technical Disclosure Bulletin, "Flying Optical Head for Disc Applications", vol. 23, No. 7A, Dec. 1980, pp. 2994–2995, by E. G. Lean.

IBM Technical Disclosure Bulletin, "Photochromic Disk File", by B. Kazan, vol. 14, No. 5, Oct. 1971, pp. 1362–1364.

IBM Technical Disclosure Bulletin, "GaAs Laser Array and Fiber-Optic Detector Array for Disc Application", vol. 23, No. 7A, Dec. 1980, pp. 2992–2993, by E. G. Lean.

IEEE Transactions on Magnetics, vol. MAG-3, No. 3, Sep. 1967, pp. 433–452.

Patent Abstracts of Japan, vol. 6, No. 34, (P-104)(912), Mar. 2, 1982.

Patent Abstracts of Japan, vol. 9, No. 86, (P-349)(1809), Apr. 16, 1985.

Patent Abstracts of Japan, vol. 9, No. 86, (P-349)(1809), Apr. 16, 1985.

Patent Abstracts of Japan, vol. 6, No. 82, (P-116)(960), May 20, 1982.

*Primary Examiner*—James W. Moffitt
*Attorney, Agent, or Firm*—Oliff & Berridge

[57] ABSTRACT

A magneto-optical memory medium of a laminar structure comprising at least one non-magnetic layer, and a plurality of magneto-optical storage layers separated from each other by corresponding non-magnetic layers, and wherein information is read out from a selected one of the storage layers by detecting a change in the Kerr rotation angle of a corresponding one of light beams of different wavelengths applied to the memory medium, which change depends upon magneto-optical anisotropy of the storage layers. A thickness of one of the storage layers is determined so that the change in the Kerr rotation angle of each of the light beams repesents the anisotropy of the corresponding storage layer, irrespective of the anisotropy of the other storage layers. Also disclosed is a magneto-optical apparatus for writing and/or reading information on or from the desired magneto-optical layers.

15 Claims, 8 Drawing Sheets

MAGNETO-OPTICAL MEMORY MEDIUM AND APPARATUS FOR WRITING AND READING INFORMATION ON AND FROM THE MEDIUM

BACKGROUND OF THE INVENTION

1. Field of the Art

The present invention relates to a magneto-optical memory medium which is formed with a plurality of magneto-optical data storage layers, to improve the density of information stored per unit area of the medium. The invention also relates to a magneto-optical apparatus for writing information on a selected one of the storage layers of such a magneto-optical memory medium, and a magneto-optical apparatus for reading information from the selected storage layer.

2. Related Art Statement

There is known a magneto-optical recording and reproduction apparatus for recording or writing information on a magneto-optical material which has a self-magnetizing property and through which a beam of light may be transmitted. The information is written by means of local magnetization of the magneto-optical material in one of opposite directions normal to the surface of the magneto-optical material. The written information on the magneto-optical memory medium is read out or reproduced by utilizing a magneto-optical effect. A commonly used magneto-optical memory medium for information storage comprises a thin data-storage layer of a magneto-optical material formed on a substrate layer made of an acrylic resin, glass or other suitable material. A magneto-optical medium of such a laminar structure in the form of a disk is generally known as a magneto-optical disk. The data storage capacity of such a known magneto-optical memory medium, i.e., the number of data bits recordable on the memory medium, is determined by the size of a spot of a light beam used for information recording or reproduction. Since the size of the beam spot is closely related to the wavelength of the light beam, the number of data bits per unit area of the memory medium is limited by the wavelength of the beam of light used. Thus, the density of information stored on the known memory medium has a limitation in relation to the wavelength of the light beam. In the meantime, a magneto-optical memory medium has a limitation in its size, due to increasing tendencies of deformation of its substrate layer and dimensional errors of the medium as the size is increased. For example, the maximum permissible diameter of a magneto-optical disk is 30 cm. As indicated above, the known magneto-optical memory medium suffers a limitation in its memory capacity.

SUMMARY OF THE INVENTION

The present invention was developed in view of the aforementioned background of the related art. It is therefore a first object of the invention to provide a magneto-optical memory medium which has a considerably increased density of information recordable thereon.

A second object of the present invention is the provision of a magneto-optical apparatus suitable for recording information on such a memory medium.

A third object of the invention is to provide a magneto-optical apparatus suitable for reading out information recorded on the memory medium.

According to the present invention, there is provided a magneto-optical memory medium consisting of a laminar structure comprising a plurality of magneto-optical storage layers formed of a magneto-optical material, and at least one non-magnetic layer, each non-magnetic layer being interposed between two adjacent layers of the plurality of storage layers. Information is written on and read from a selected one of the plurality of storage layers.

The magneto-optical memory medium of the invention constructed as described above is capable of storing information on each of the plurality of magneto-optical layers which are separated from each other by the appropriate non-magnetic layer, whereby the amount of information recordable per unit area is drastically increased.

According to one preferred embodiment of the invention, the laminar structure of the memory medium comprises: a reflector layer reflecting a light beam; a non-magnetic layer formed on the reflector layer; a second magneto-optical layer formed on the non-magnetic layer; another non-magnetic layer formed on the second magneto-optical layer; and a first magneto-optical layer formed on the aforementioned another non-magnetic layer. In accordance with the invention, information is stored on the first and second magneto-optical storage layers through magnetization thereof in one of opposite directions normal to their surfaces; and the information stored on the first and second magneto-optical storage layers is read out through detection of changes in the Kerr rotation angles of a first and a second beam of light of different wavelengths applied to the memory medium, respectively, the Kerr rotation angles of the first and second beams of light being changed depending upon the direction of magnetization of the first and second storage layers, and the first magneto-optical storage layer having a thickness which is determined so that the change in the Kerr rotation angle of the first beam of light represents the direction of magnetization of the first storage layer, irrespective of the direction of magnetization of the second storage layer, while the change in the Kerr rotation angle of the second beam of light represents the direction of magnetization of the second storage layer, irrespective of the direction of magnetization of the first storage layer.

According to another preferred embodiment of the invention, each of the magneto-optical storage layers consists of a first magneto-optical film having a comparatively low Curie point, and a second magneto-optical film having a comparatively high magneto-optical effect. This arrangement is advantageous in that information is easily written on the first magneto-optical layer with the low Curie point, and the recorded information on the first layer is read out from the second magneto-optical layer magnetically connected to the first magneto-optical layer. Relatively high reliability of information reproduction is achieved due to the comparatively high magneto-optical effect of the second layer.

In accordance with a further advantageous embodiment of the invention, the plurality of magneto-optical storage layers have different Curie points, so that information may be written on a desired one of the plurality of storage layers by changing the intensity of a light beam incident upon the memory medium.

According to the present invention, there is also provided a magneto-optical apparatus suitable for recording information on a magneto-optical memory medium constructed according to the invention. The magneto-optical recording apparatus comprises: a laser device for emitting a laser beam and directing the laser beam toward the memory medium for writing information on a selected one of the plurality of magneto-optical storage layers; and means for converging the laser beam selectively on the selected one of the storage layers of the memory medium.

In the magneto-optical recording apparatus of the invention constructed as described above, the laser beam emitted from the laser device is converged on the selected one of the plural storage layers of the memory medium, whereby a spot of the selected storage layer is heated by the laser beam. Accordingly, after the heated spot has been cooled, information may be written on the spot by generating a magnetic field to magnetize the spot in one of opposite directions normal to the surface of the selected storage layer. Since the laser beam is converged on the selected storage layer only, i.e., the laser beam is not converged on the other storage layers, the corresponding spots of the other storage layers will not be heated by the laser beam, and consequently the information stored thereon will not be erased for writing of new information.

In the above embodiment, the laser device may comprise an object lens having a depth of focus which is smaller than a thickness of each non-magnetic layer of the memory medium. This arrangement makes it possible to heat only the selected storage layer, without affecting the information stored on the other storage layers.

According to another embodiment of the recording apparatus of the invention, a laser light source is provided for emitting a laser beam toward the memory medium for writing information on a selected one of the plurality of magneto-optical storage layers of the memory medium which have different Curie points. The apparatus further comprises means for changing the intensity of the laser beam, to heat the storage layers to different temperatures and thereby prepare for effecting the writing of the information selectively on the storage layers of the medium.

In the above arrangement, a difference in Curie point (Curie temperature) of the different storage layers permits easy writing of information on the desired one of the storage layers by adjusting the intensity of the laser beam, even if the plural storage layers are disposed in relatively close relation with each other.

In the above case, it is preferred to reduce the intensity of the laser beam successively so as to write information on the storage layers in the order of the Curie point, beginning with the storage layer having the highest Curie point. In this case, the information may be written only on the selected storage layer without reducing the depth of focus of the laser beam, or increasing the thickness of each non-magnetic layer which separates the magneto-optical storage layers from each other.

According to the invention, there is further provided a magneto-optical apparatus suitable for reading or retrieving information from a selected one of the plurality of magneto-optical storage layers of the memory medium, the apparatus comprising means for applying to the memory medium a plurality of laser meams of different wavelengths corresponding to the plurality of storage layers of the medium, and further comprising means for reading information from the selected storage layer, based on a change of the corresponding laser beam which occurs due to magneto-optical anisotropy of the selected storage layer.

In the above apparatus, the change of the laser beam of a wavelength corresponding to the selected storage layer of the memory medium is obtained as a change in the Kerr rotation angle of the corresponding laser beam in relation to the direction of magnetization (magneto-optical anisotropy) of the selected storage layer, irrespective of the direction of magnetization of the other storage layers. Thus, the information recorded on the individual storage layers may be retrieved by detecting the changes in the Kerr rotation angles of the laser beams having the different wavelengths corresponding to the storage layers.

BRIEF DESCRIPTION OF THE DRAWING

The foregoing and additional objects, features and advantages of the present invention will be better understood from reading the following detailed description of several preferred embodiments of the invention, when considered in conjunction with the accompanying drawing, in which.

DETAILED DESCRIPTION OF THE PREFERRED EMBODIMENTS

The invention will be described in detail by reference to the accompanying drawing showing preferred embodiments of the invention.

Figure 1:
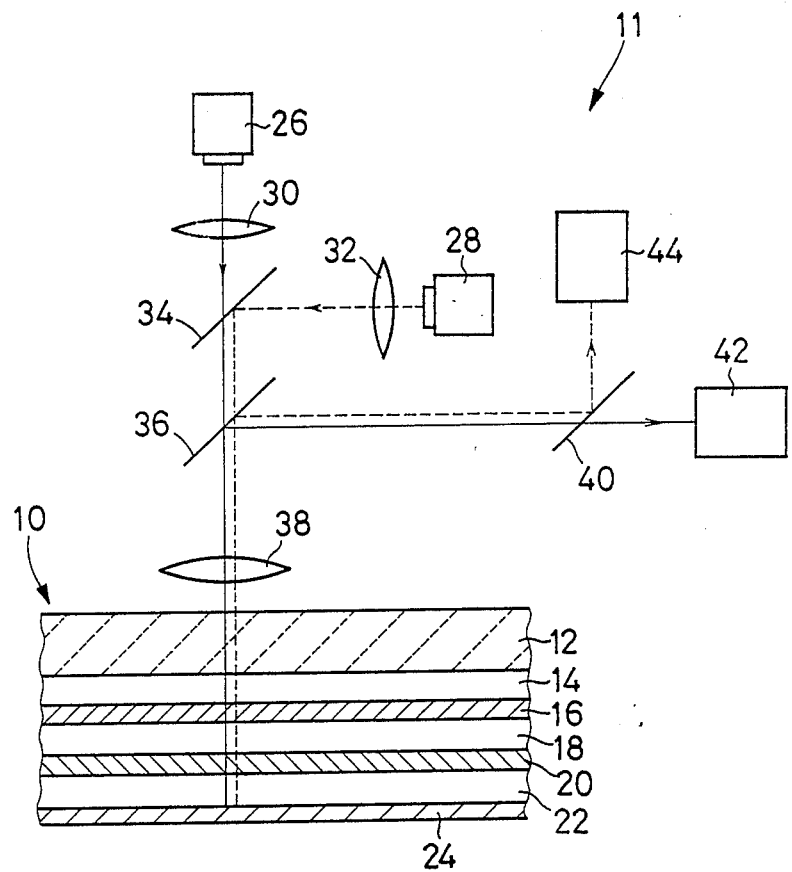
FIG. 1 is a schematic illustration of a general arrangement of one embodiment of an apparatus of the invention for reading out information from one embodiment of a magneto-optical memory medium of the invention.

Referring first to FIG. 1, there is generally shown at 11 an embodiment of a magneto-optical apparatus of the invention for reading information from a magneto-optical memory medium of the invention in the form of a magneto-optical memory disk 10. The magneto-optical memory disk 10 consists of a laminar structure comprising a non-magnetic layer 14, a first magneto-optical storage layer 16, an intermediate non-magnetic layer 18, a second magneto-optical storage layer 20, another non-magnetic layer 22 and a reflector layer 24, which are formed in this order on one surface of a transparent substrate layer 12 by vapor deposition, sputtering or other suitable known methods. The transparent substrate layer 12 may be formed of a glass material, transparent resin, or other suitable transparent material. In this specific embodiment, the substrate layer 12 is made of an acrylic resin such as polymethyl methacrylate (PMMA). The use of acrylic resins for the substrate layer 12 facilitates the manufacture of the memory disk 10, and permits easy handling of the same. The non-magnetic layers 14, 22 are provided to protect the first and second thin magneto-optical storage layers 16 and 20, and are formed of a transparent non-magnetic or dielectric material such as aluminum nitride (AlN), silicon oxide (SiO), silicon dioxide ($SiO_2$), or metallic silicon (Si). More specifically, the non-magnetic layers 14, 22 protect the first and second storage layers 16, 20 from their chemical change (oxidation, etc.), and have thicknesses of about 1421Å and 1336Å, respectively. However, these non-magnetic layers 14, 22 may be eliminated if a chemical change of the first and second storage layers 16, 20 is hardly anticipated. The first and second storage magneto-optical layers 16, 20 are separated by the intermediate non-magnetic layer 18, and the laminar structure of these three layers 16, 18, 20 are sandwiched by the non-magnetic layers 14, 22. The first magneto-optical storage layer 16 has a thickness of about 110Å, and the second magneto-optical storage layer 20 has a thickness of about 800Å, while the intermediate non-magnetic layer 18 has a thickness of about 17830Å. The first and second storage layers 16, 20 are formed of magneto-optical materials having an excellent magneto-optical effect. For example, the storage layers 16, 20 may be formed of amorphous GdTbFe, TbFe, TbFeCo, GdCo or GdDyFe, polycrystalline MnCuBi, monocrystalline $TbFeO_3$, or rare earth iron garnet. In this embodiment, the storage layers 16, 20 are made of GdTbFe. The intermediate non-magnetic layer 18 is made of a translucent non-magnetic or dielectric material, such as that used for the non-magnetic layer 14. The layer 18 may be a laminar structure consisting of a plurality of translucent non-magnetic films. This laminar structure is preferred for easy formation of the non-magnetic layer 18 with a large thickness. For instance, the laminar non-magnetic layer 18 may be formed by alternate films of $SiO_2$ and SiO. The reflector layer 24 is made of various materials which reflect light, typically a layer of aluminum formed by vapor deposition. However, the non-magnetic layer 22 and the reflector layer 24 may be replaced by a plastic layer having a large thickness. A relatively thick plastic layer may serve to sufficiently reflect incident light at its interface with the magneto-optical storage layer 20, and may function at the same time to protect the storage layer 20 from oxidation.

The magneto-optical memory disk 10 is rotated by a driving device (not shown) about its axis, which is oriented vertically, for example. In the meantime, the magneto-optical reading apparatus 11 has an optical system including an object lens 38. The optical system is adapted to be movable relative to the memory disk 10 in a horizontal plane and in a radial direction of the memory disk 10, so that a beam of light incident to the memory disk 10 for information reproduction may be moved in the radial direction of the disk 10. The optical system further includes first and second laser light sources 26 and 28 which emit laser beams of different wavelengths in the form of linearly polarized light, such that the laser beams are directed to a dichroic mirror 34 through collimator lenses 30, 32, respectively. In the present embodiment, the laser beam (hereinafter referred to as "first laser beam") produced by the first laser light source 26 has a wavelength $\lambda 1$ of 8300Å, while the laser beam (hereinafter called "second laser beam") of the second laser light source 28 has a wavelength $\lambda 2$ of 7800Å. The dichroic mirror 34 permits the first laser beam of the wavelength $\lambda 1$ to pass therethrough, and reflects the second laser beam of the wavelength $\lambda 2$. The composite laser of the wavelengths $\lambda 1$ and $\lambda 2$ from the dichroic mirror 34 is transmitted through a half mirror 36 and the object lens 38 positioned opposite to the memory disk 10, whereby the composite laser beam is incident to the memory disk 10. As indicated above, the optical system includes the laser light sources 26, 28, collimator lenses 30, 32, dichroic mirror 34 and object lens 38, which cooperate with each other to apply laser beams to the magneto-optical memory disk 10 for reading information therefrom. The composite laser beam incident to the memory disk 10 is reflected by the reflector layer 24, and transmitted to a dichroic mirror 40 through the object lens 38 and the half mirror 36. The dichroic mirror 40 permits the first laser beam to pass therethrough, and reflects the second laser beam, whereby the composite laser beam from the half mirror 36 is separated. The first and second laser beams of the wavelengths $\lambda 1$ and $\lambda 2$ are received by a first and a second detecting device 42, 44, respectively. The first and second detecting devices 42, 44 detect angles of Kerr rotation of the first and second laser beams of the different wavelengths $\lambda 1$, and $\lambda 2$, respectively. The Kerr rotation angles of the first and second laser beams ($\lambda 1$, $\lambda 2$) are changed depending upon the magneto-optical anisotropy or the direction of magnetization of the parts of the first and second magneto-optical storage layers 16, 20 which are exposed to the laser beams. Therefore, by detecting the Kerr rotation angle of the first or second laser beam, it is possible to reproduce the information which has been recorded in the first or second storage layer 16, 20 by means of magnetization of each memory location thereof in one of opposite directions perpendicular to the surface of the memory disk 10. Thus, the object lens 38, half mirror 36, dichroic mirror 40, first detecting device 42, and second detecting device 44, cooperate to constitute a detecting device for detecting angles of the Kerr rotation of the first and second laser beams.

Figure 2:
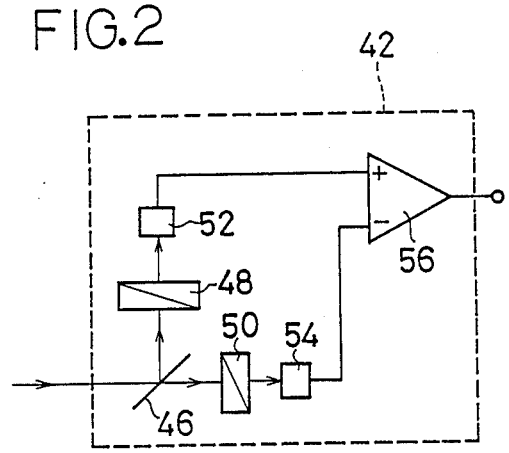
FIG. 2 is a fragmentary schematic view showing in detail a detecting device of the apparatus of FIG. 1.

The detecting devices 42, 44 are identically constructed. By way of example, the first detecting device 42 is illustrated in FIG. 2, wherein the first laser beam of the wavelength $\lambda 1$ reflected by the memory disk 10 is split by a half mirror 46 into two beams, one of which is received by a photodiode 52 through an analyzer 48, and the other of which is received by a photodiode 54 through an analyzer 50. The analyzers 48 and 50 have planes of polarization which are perpendicular to each other, and are inclined 45 degrees with respect to a plane of polarization of the incident laser beams. Accordingly, the rotation of the polarization plane of the first laser beam will cause, for example, an increase in the amount of light received by the photodiode 52, and a decrease in the amount of light received by the photodiode 54. Outputs of the photodiodes 52, 54 are applied to corresponding inputs of a differential amplifier 56, which provides an output representative of the information stored on the first magneto-optical storage layer 16. This differential amplifier 56 eliminates noises due to output variations of the laser light sources 26, 28. While the present embodiment uses the laser light sources 26, 28 of the semiconductor or external resonance type for producing linearly polarized laser beams, it is possible to use laser sources of the internal resonance type which produce circularly polarized light. In this case, the laser beams emitted from the laser sources are applied through a polarizer.

The operation of the instant magneto-optical reading apparatus 11 will be described. The information stored in the first storage layer 16 of the memory disk 10, and the information stored in the second storage layer 20 spaced from the first storage layer 16 by the intermediate non-magnetic layer 18, are read out independently of each other.

Figure 3:
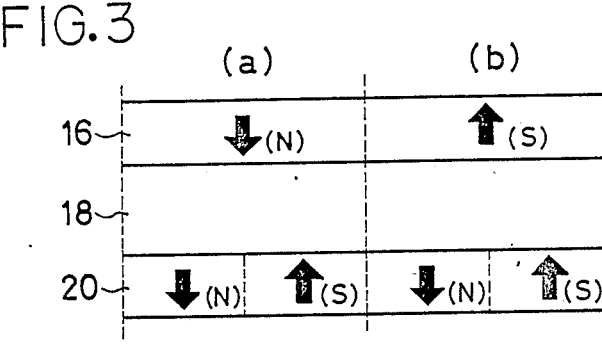
FIGS. 3 and 4 are views indicating, in two different ways, respectively, four possible combinations of magnetizing directions (N and S) of two magneto-optical storage layers of the memory medium of FIG. 1.
Figure 4:
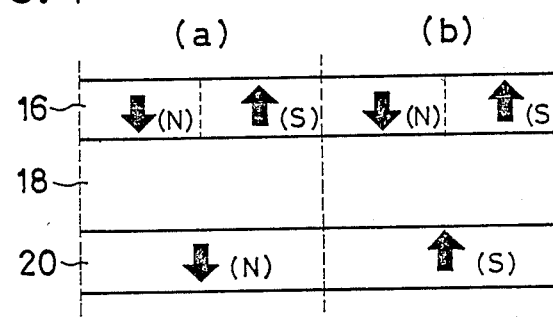

For reading the information from the first storage layer 16 independently of the information stored in the second storage layer 20, an the amount of change in the Kerr rotation angle of the first laser beam should represent the direction of magnetization (N or S) of the first storage layer 16 as indicated at (a) and (b) in FIG. 3, irrespective of the direction of magnetization of the second storage layer 20. Similarly, the amount of change in the Kerr rotation angle of the second laser beam should represent the direction of magnetization (N or S) of the second storage layer 20 as indicated at (a) and (b) in FIG. 4, irrespective of the direction of magnetization of the first storage layer 16.

Through extensive research and investigations, the inventor of the present invention has obtained the following findings in connection with the amount of change or difference in the Kerr rotation angle of each of the first and second laser beams of the different wavelengths $\lambda 1$ and $\lambda 2$, depending upon the four possible combinations of the magnetization directions of the first and second magneto-optical storage layers 16, 20. More specifically stated, it was found that the Kerr rotation angles of the four combinations with respect to each other are changed differently as the thickness of one of the first and second storage layers 16, 20 is changed. In addition, it was found that when the above one storage layer 16, 20 is given a specific thickness, the amount of change of the Kerr rotation angles of the four combinations with respect to each other represents the direction of magnetization of each one of the first and second storage layers 16, 20, irrespective of the direction of magnetization of the other storage layer 20, 16. The principle of the present invention is based on the above findings.

Figure 5:
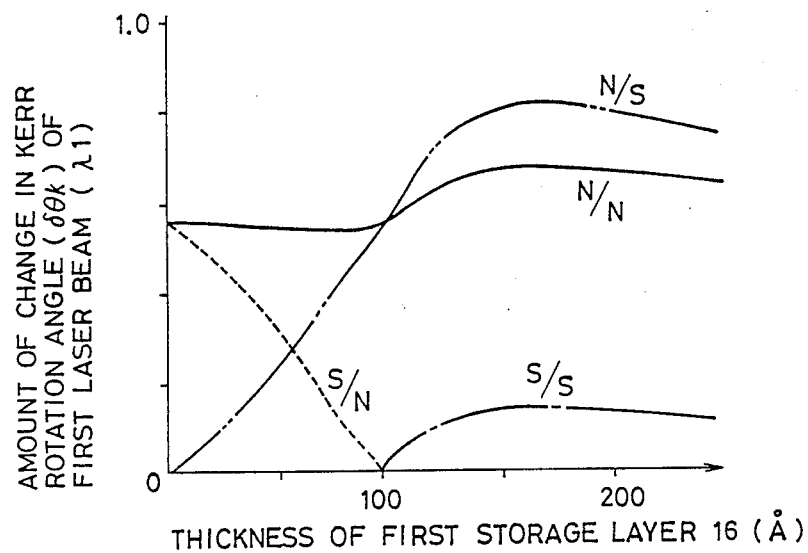
FIGS. 5 and 6 are graphs showing relations between the thickness of the first magneto-optical storage layer of the memory medium, and variations of the four combinations of FIGS. 3 and 4 in the amount of change in the Kerr rotation angles of two light beams of different wavelengths, respectively.
Figure 6:
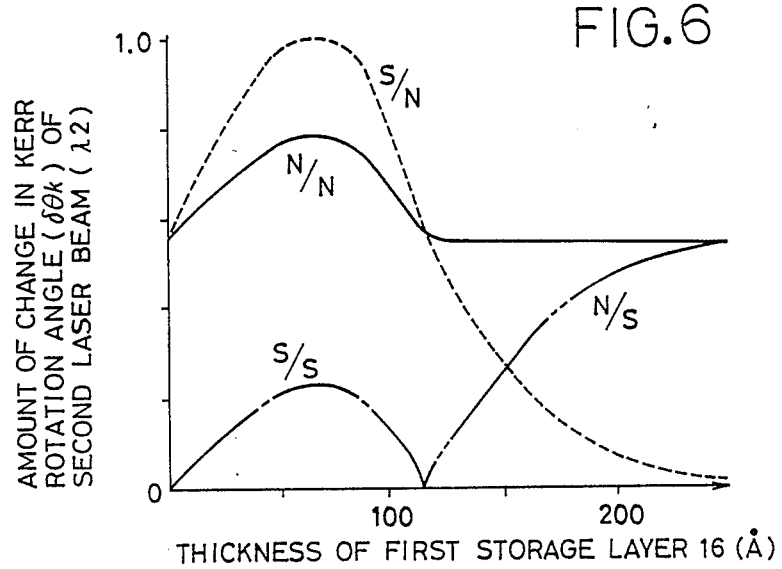

Described in greater detail, a simulation conducted by the inventor revealed characteristics curves of the first laser beam (wavelength $\lambda 1 = 8300 \text{Å}$) as shown in FIG. 5. The curves show differences in the Kerr rotation angle of the four combinations N/S, N/N, S/N and S/S of the magnetization directions of the first and second storage layers 16, 20, relative to each other. The curves N/S and N/N indicate the cases where the first storage layer 16 is magnetized in the N direction, while the second storage layer 20 is magnetized in the S and N directions, respectively. The curves S/N and S/S indicate the cases where the first storage layer 16 is magnetized in the S direction, while the second storage layer 20 is magnetized in the N and S directions, respectively. As indicated in the figure, an amount of change in the Kerr rotation angle of the first laser beam among the four combinations N/S, N/N, S/N, S/S relative to each other distinctly represents the magnetizing direction of the first storage layer 16, irrespective of the magnetizing direction of the second storage layer 20, if the first storage layer 16 has a thickness in the neighbourhood of 100Å. For example, the Kerr rotation angle is changed by an approximate amount of 0.6 degrees ($\delta\theta k$) when the magnetizing direction of the first storage layer 16 is changed from S to N, regardless of whether the second storage layer 20 is magnetized in the N or S direction. Similarly, the simulation revealed characteristics curves of the second laser beam (wavelength $\lambda 2 = 7800 \text{Å}$) as shown in FIG. 6. As indicated in the figure, the amount of change in the Kerr rotation angle of the second laser beam among the four combinations N/S, N/N, S/N, S/S relative to each other distinctly represents the magnetizing direction of the second storage layer 20, irrespective of the magnetizing direction of the first storage layer 16, if the second storage layer 20 has a thickness in the neighbourhood of 1200Å.

As previously indicated, the first magneto-optical storage layer 16 of the memory disk 10 has a thickness of 110Å. Accordingly, a difference or change in the Kerr rotation angle of the first laser beam reflected by the memory disk 10, which is obtained due to the magneto-optical anisotropy (N or S) of the first storage layer 16, identifies one of the opposite magnetizing directions (N or S) of the first storage layer 16 with a sufficiently high level of distinction. Therefore, the detection of the Kerr rotation angle of the first storage layer 16 by the first detecting device 42 enables the reading apparatus 11 to provide an output signal which indicates the information (N or S) stored on a part of the first storage layer 16 to which the first laser beam is incident. In the same manner, a change in the Kerr rotation angle of the second laser beam reflected by the disk 10 permits reliable identification of the magnetizing direction of the second storage layer 20, and the detection of the Kerr rotation angle of the second storage layer 20 by the second detecting device 44 enables the reading apparatus 11 to provide an output signal indicative of the information stored on the corresponding part of the second storage layer 20.

As described herein-above, the instant magneto-optical reading apparatus 11 is capable of reading out information selectively from the first and second magneto-optical storage layers 16, 20, as needed. Hence, the density of information recordable on the memory disk 10, i.e., the amount of information that can be stored on the memory disk 10, is almost doubled, as compared with that of a known magneto-optical disk having a single storage layer. This is a drastic increase in the memory capacity of the disk.

The aforementioned simulation which demonstrated the characteristics of FIGS. 5 and 6, was conducted based on Equation (1) indicated below. Equation (1) is obtained by using Maxwell's electromagnetic equations. Conditions of each of the layers of the magneto-optical memory disk 10 are applied to the Maxwell's equations to obtain relations between incident and reflected light beams when linearly polarized light is incident to the memory disk 10. Based on these obtained relations, an angle $\phi$ of the Kerr rotation of the reflected light beam is expressed by Equation (1), provided an electric field strength of the reflected light beam consists of a component Ey having a polarization plane parallel to that of the incident light beam, and a component Ex having a polarization plane perpendicular to that of the reflected light beam. In this connection, it is noted that the relative amount of change ($\delta\theta k$) of FIGS. 5 and 6 is expressed as a difference from the minimum value of the four values of the Kerr rotation angle $\phi$, since the angle $\phi$ is changed depending upon the directions of magnetization of the first and second storage layers 16, 20.

$$\tan 2\phi = \tan 2\alpha \cos(\phi - \theta) \quad (1)$$

$$\text{where, } \tan \alpha = \frac{|Ex|}{|Ey|} \quad (2)$$

$$\theta = \tan^{-1} \frac{b_{11}''}{b_{11}'} \quad (3)$$

$$\phi = \tan^{-1} \frac{b_{21}''}{b_{21}'} \quad (4)$$

Assuming $b_{11}$ and $b_{21}$ are expressed as complex numbers indicated by Equations (5) and (6), the components $|Ex|$ and $|Ey|$ of the electric field strength are expressed by Equations (7) and (8):

$$b_{11} = b_{11}' + j\, b_{11}'' \ldots \quad (5)$$

$$b_{21} = b_{21}' + j\, b_{21}'' \ldots \quad (6)$$

$$|Ey| = \sqrt{b_{11}'^2 + b_{11}''^2} \ldots \quad (7)$$

$$|Ex| = \sqrt{b_{21}'^2 + b_{21}''^2} \ldots \quad (8)$$

where, $b_{11}$ and $b_{21}$ are defined as indicated by Equations (9) and (10):

$$b_{11} = \frac{1}{D}(a_{21}a_{33} - a_{23}a_{31}) \quad (9)$$

-continued $$b_{21} = \frac{1}{D}(a_{41}a_{33} - a_{43}a_{31}) \quad (10)$$

where, $$D = a_{11}a_{33} - a_{13}a_{31} \ldots \quad (11)$$

Values $a_{ij}$ used in Equations (9), (10) and (11) are expressed as components of $4 \times 4$ matrices indicated by Equation (12):

$$(a_{ij}) = (MA1) \cdot (MA21) \cdot (MA31) \cdot (MA41) \cdot (MA51) \cdot (MA61) \ldots \quad (12)$$

The matrices of Equation (12) are expressed by Equations (13) through (18), respectively, wherein the following definitions are given:

n0: refractive index of the substrate sheet 12
n1 and d1: refractive index and thickness of the non-magnetic layer 14
n2 and d2: refractive index and thickness of the first magneto-optical storage layer 16
n3 and d3: refractive index and thickness of the intermediate non-magnetic layer 18
n4 and d4: refractive index and thickness of the second magneto-optical storage layer 20
n5 and d5: refractive index and thickness of the non-magnetic layer 22
n6: refractive index of the reflector layer 24

$$n_2^2 \begin{pmatrix} 1 & -jg_2 & 0 \\ jg_2 & 1 & 0 \\ 0 & 0 & 1 \end{pmatrix} \text{ Dielectric constant tensor of the first storage layer 16}$$

$$n_4^2 \begin{pmatrix} 1 & -jg_4 & 0 \\ jg_4 & 1 & 0 \\ 0 & 0 & 1 \end{pmatrix} \text{ Dielectric constant tensor of the second storage layer 20}$$

$$(MA1) = \begin{pmatrix} \frac{1}{2}(1 + n_{10} & 1 - n_{10} & 0 & 0) \\ \frac{1}{2}(1 - n_{10} & 1 + n_{10} & 0 & 0) \\ \frac{1}{2}(0 & 0 & 1 + n_{10} & 1 - n_{10}) \\ \frac{1}{2}(0 & 0 & 1 - n_{10} & 1 + n_{10}) \end{pmatrix} \quad (13)$$

where, $n_{10} = n_1/n_0$ $$(MA21) = \begin{pmatrix} \frac{e^{jk_{1z}d_1}}{2}(1 + n_{21}\sqrt{1 + g_2} & 1 - n_{21}\sqrt{1 - g_2} & 1 + n_{21}\sqrt{1 - g_2} & 1 - n_{21}\sqrt{1 + g_2}) \\ \frac{e^{-jk_{1z}d_1}}{2}(1 - n_{21}\sqrt{1 + g_2} & 1 + n_{21}\sqrt{1 - g_2} & 1 - n_{21}\sqrt{1 - g_2} & 1 + n_{21}\sqrt{1 + g_2}) \\ \frac{je^{jk_{1z}d_1}}{2}(-1 - n_{21}\sqrt{1 + g_2} & -1 + n_{21}\sqrt{1 - g_2} & 1 + n_{21}\sqrt{1 - g_2} & 1 - n_{21}\sqrt{1 + g_2}) \\ \frac{je^{-jk_{1z}d_1}}{2}(-1 + n_{21}\sqrt{1 + g_2} & -1 - n_{21}\sqrt{1 - g_2} & 1 - n_{21}\sqrt{1 - g_2} & 1 + n_{21}\sqrt{1 + g_2}) \end{pmatrix} \quad (14)$$

where, $n_{21} = n_2/n_1$, $k_{12} = (2\pi/\lambda)n_1$ ($\lambda$: wavelength)

$$(MA31) = \begin{pmatrix} e^{jk_{z1}^{+}d2} & 0 & 0 & 0 \\ 0 & e^{-jk_{z2}^{+}d2} & 0 & 0 \\ 0 & 0 & e^{jk_{z2}^{+}d2} & 0 \\ 0 & 0 & 0 & e^{-jk_{z1}^{+}d2} \end{pmatrix} \cdot (MA3)^{-1} \quad (15)$$

where, $$(MA3) = \begin{pmatrix} \frac{1}{2}(1 + n_{23}\sqrt{1+g_2} & 1 - n_{23}\sqrt{1-g_2} & 1 + n_{23}\sqrt{1-g_2} & 1 - n_{23}\sqrt{1+g_2}) \\ \frac{1}{2}(1 - n_{23}\sqrt{1+g_2} & 1 + n_{23}\sqrt{1-g_2} & 1 - n_{23}\sqrt{1-g_2} & 1 + n_{23}\sqrt{1+g_2}) \\ \frac{j}{2}(-1 - n_{23}\sqrt{1+g_2} & -1 + n_{23}\sqrt{1-g_2} & 1 + n_{23}\sqrt{1-g_2} & 1 - n_{23}\sqrt{1+g_2}) \\ \frac{j}{2}(-1 + n_{23}\sqrt{1+g_2} & -1 - n_{23}\sqrt{1-g_2} & 1 - n_{23}\sqrt{1-g_2} & 1 + n_{23}\sqrt{1+g_2}) \end{pmatrix}$$

$n_{23} = n_2/n_3$, $k_{2z1}^{+} = \frac{2\pi}{\lambda} \cdot n_2 \sqrt{1+g_2}$, $k_{2z2}^{+} = \frac{2\pi}{\lambda} \cdot n_2 \sqrt{1-g_2}$ $$(MA41) = \begin{pmatrix} \frac{e^{jk_{3z}d3}}{2}(1 + n_{43}\sqrt{1+g_4} & 1 - n_{43}\sqrt{1-g_4} & 1 + n_{43}\sqrt{1-g_4} & 1 - n_{43}\sqrt{1+g_4}) \\ \frac{e^{-jk_{3z}d3}}{2}(1 - n_{43}\sqrt{1+g_4} & 1 + n_{43}\sqrt{1-g_4} & 1 - n_{43}\sqrt{1-g_4} & 1 + n_{43}\sqrt{1+g_4}) \\ \frac{je^{jk_{3z}d3}}{2}(-1 - n_{43}\sqrt{1+g_4} & -1 + n_{43}\sqrt{1-g_4} & 1 + n_{43}\sqrt{1-g_4} & 1 - n_{43}\sqrt{1+g_4}) \\ \frac{je^{-jk_{3z}d3}}{2}(-1 + n_{43}\sqrt{1+g_4} & -1 - n_{43}\sqrt{1-g_4} & 1 - n_{43}\sqrt{1-g_4} & 1 + n_{43}\sqrt{1+g_4}) \end{pmatrix} \quad (16)$$

where, $n_{43} = n_4/n_3$, $k_{3z} = (2\pi/\lambda)n_3$ $$(MA51) = \begin{pmatrix} e^{jk_{z1}^{+}d4} & 0 & 0 & 0 \\ 0 & e^{-jk_{z1}^{+}d4} & 0 & 0 \\ 0 & 0 & e^{jk_{z2}^{+}d4} & 0 \\ 0 & 0 & 0 & e^{-jk_{z1}^{+}d4} \end{pmatrix} \cdot (MA5)^{-1} \quad (17)$$

where, $$(MA5) = \begin{pmatrix} \frac{1}{2}(1 + n_{45}\sqrt{1+g_4} & 1 - n_{45}\sqrt{1-g_4} & 1 + n_{45}\sqrt{1-g_4} & 1 - n_{45}\sqrt{1+g_4}) \\ \frac{1}{2}(1 - n_{45}\sqrt{1+g_4} & 1 + n_{45}\sqrt{1-g_4} & 1 - n_{45}\sqrt{1-g_4} & 1 + n_{45}\sqrt{1+g_4}) \\ \frac{j}{2}(-1 - n_{45}\sqrt{1+g_4} & -1 + n_{45}\sqrt{1-g_4} & 1 + n_{45}\sqrt{1-g_4} & 1 - n_{45}\sqrt{1+g_4}) \\ \frac{j}{2}(-1 + n_{45}\sqrt{1+g_4} & -1 - n_{45}\sqrt{1-g_4} & 1 - n_{45}\sqrt{1-g_4} & 1 + n_{45}\sqrt{1+g_4}) \end{pmatrix}$$

$n_{45} = n_4/n_5$, $k_{4z1}^{+} = \frac{2\pi}{\lambda} n_4 \sqrt{1+g_4}$, $k_{4z2}^{+} = \frac{2\pi}{\lambda} n_4 \sqrt{1-g_4}$ $$(MA61) = \begin{pmatrix} \frac{e^{jk_{5z}d5}}{2}(1 + n_{45} & 1 - n_{65} & 0 & 0) \\ \frac{e^{-jk_{5z}d5}}{2}(1 - n_{65} & 1 + n_{65} & 0 & 0) \\ \frac{e^{jk_{5z}d5}}{2}(0 & 0 & 1 + n_{65} & 1 - n_{65}) \\ \frac{e^{-jk_{5z}d5}}{2}(0 & 0 & 1 - n_{65} & 1 + n_{65}) \end{pmatrix} \quad (18)$$

where, $n_{65} = n_6 / n_5$, $k_{5z} = \frac{2\pi}{\lambda} n_5$

The characteristic curves shown in FIGS. 5 and 6 are obtained where the first storage layer 16 of the memory disk 10 is formed of GdTbFe. If other materials are used for the first storage layer 16, the characteristic relations between the Kerr rotation angles of the first and second laser beams and the thickness of the first storage layer 16 will be obviously changed accordingly. Therefore, it will be understood that the optimum thickness of the first storage layer 16 of the memory disk 10 must be changed accordingly. Although the instant embodiment uses the first storage layer 16 as a layer whose thickness is determined according to the concept of the invention, it is possible that the thickness of the second storage layer 20 is determined so as to permit reliable detection of the magnetization directions of the layers 16, 20 based on the amount of change in the Kerr rotation angles.

Figure 7:
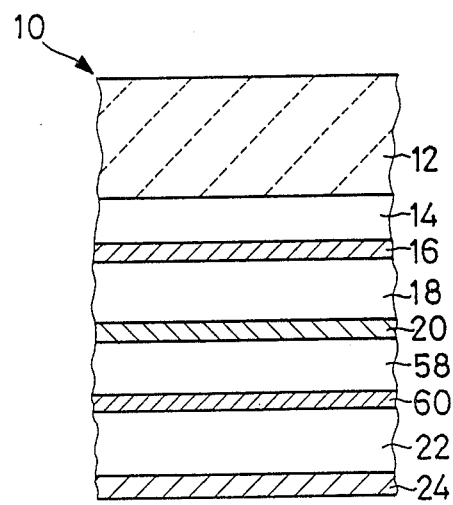
FIGS. 7 and 8 are fragmentary views in cross section of modified embodiments of a magneto-optical memory medium of the invention.

The magneto-optical memory disk 10 may comprise three or more magneto-optical storage layers, as illustrated in FIG. 7 wherein a second intermediate non-magnetic layer 58 and a third magneto-optical storage layer 60 are interposed between the second storage layer 20 and the non-magnetic layer 22. In this instance, three laser beams of different wavelengths are necessary to read out information from a selected one of the three magneto-optical storage layers 16, 20 and 60. Apparently, the memory disk 10 of FIG. 7 has a memory capacity about three times as large as a conventional memory disk with a single storage layer.

Figure 8:
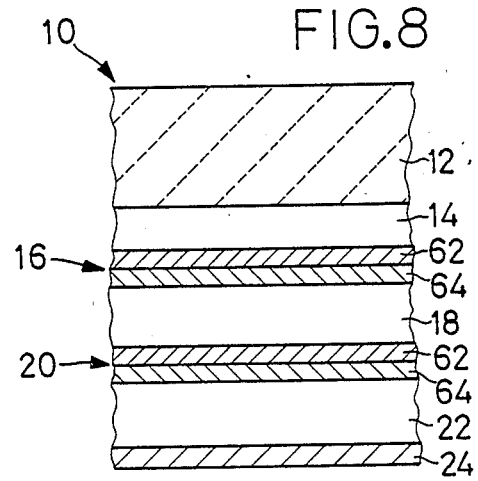

Further, each of the storage layers 16, 20 of the memory disk 10 may consist of a plurality of magneto-optical films superposed in direct contact with each other without a non-magnetic layer interposed therebetween. For example, each of the storage layers 16, 20 consists of a GdFe film 62 and a TbFe film 64, as illustrated in FIG. 8. The TbFe film 64 has a comparatively low Curie point, so that information may be written with a relatively low level of electric power. The GdFe film 62 which is magnetically connected to the TbFe film 64, has a comparatively large magneto-optical effect, which therefore permits easier writing and reading of information on and from the storage layer 16, 20.

The illustrated memory medium 10 in the form of a disk may be replaced by a magneto-optical memory medium of other shapes such as a tape or drum.

In the illustrated embodiment, the two laser light sources 26, 28 are provided for producing the first and second laser beams of different wavelengths $\lambda 1$ and $\lambda 2$. However, it is possible to use a semiconductor laser array, argon laser device or other light source devices which generate beams of different wavelengths, or a chromatic light source emitting a light beam of a variable wavelength. In this case, the information reproduction may be accomplished with a single light source, or a plurality of light sources which is smaller in number than the magneto-optical storage layers of the memory disk 10.

While the wavelengths $\lambda 1$ and $\lambda 2$ of the first and second laser beams produced by the laser light sources 26, 28 are 8300Å and 7800Å, respectively, which are readily obtainable with a commercially available semiconductor laser element, it will be understood that the wavelengths of the laser beams of the light sources 26, 28 may be changed as desired.

In the illustrated embodiment, the first and second laser beams of the wavelengths $\lambda 1$ and $\lambda 2$ are used corresponding to the first and second storage layers 16, 20, so that the information stored on these layers 16, 20 may be read out by detecting amounts of change in the Kerr rotation angle of the first and second laser beams, respectively. However, the information may be reproduced, for example, by obtaining a signal representative of a sum of changes of the Kerr rotation angles of the first and second laser beams ($\lambda 1$) and ($\lambda 2$) incident upon the first and second storage layers 16, 20, and a signal representative of a difference between these changes of the Kerr rotation angles, and processing these signals to detect the information stored on the first and second storage layers 16, 20.

There will next be described an embodiment of a magneto-optical recording apparatus for writing information selectively on the first and second storage layers 16, 20 of the memory disk 10. In the following description, the same reference numerals used in the preceding description will be used to identify the corresponding elements. In the interest of brevity and simplification, repeated description of these elements will not be provided.

Figure 9:
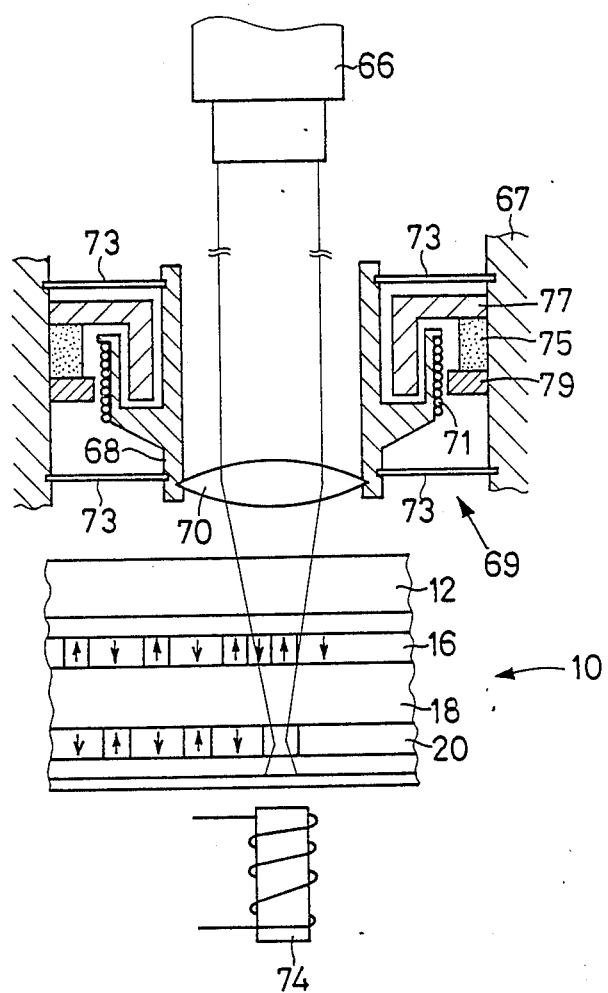
FIG. 9 is a schematic view of an embodiment of an apparatus of the invention for writing information selectively on the individual storage layers of the memory medium of FIG. 1, showing one operating position of the apparatus.

Referring to FIG. 9, the recording apparatus comprises a laser light source 66 which includes a collimator lens and produces a laser beam. The laser beam is directed to the memory disk 10 through an object lens 70 which is supported at one end of an object-lens sleeve 68. The apparatus further comprises a frame 67 which carries a positioning mechanism 69 for positioning the object-lens sleeve 68 relative to the memory disk 10. The sleeve 68 carries a drive coil 71 wound in the form of a ring, so that the sleeve 68 is movable with an electromagnetic force of the coil 71 between a first position near the memory disk 10, and a second position remote from the memory disk 10. More particularly, the sleeve 68 is supported by the frame 67 through sheet springs 73, so that the sleeve 68 is movable along an optical axis of the object lens 70 (in the vertical direction of FIG. 9), relative to the frame 67. To the frame 67 are attached an annular permanent magnet 75, and yoke members 77, 79, such that the coil 71 on the sleeve 68 is located in a magnetic field produced between the two yoke members 77, 79. With the coil 71 energized, the object lens 70 is moved to a position corresponding to the amount of an electric current applied to the coil 71. Thus, the positioning mechanism 69 serves as positioning means for positioning the object lens 70 relative to the memory disk 10 so that the laser beam produced by the laser light source 66 is converged selectively on the first and second storage layers 16, 20. In other words, the positioning mechanism 69 serves as selector means for positioning a focal point of the laser beam on a selected one of the storage layers 16, 20.

The object lens 70 has a depth of focus $\delta f$ which is smaller than the thickness (17830Å) of the intermediate non-magentic layer 18 of the magneto-optical memory disk 10. It is known that the depth of focus $\delta f$ of the object lens 70 is given by Equation (19):

$$\delta f = \pm 4/\pi \cdot \lambda (\tfrac{1}{2} \text{ NA})^2 \qquad (19)$$

where,
λ: wavelength of laser beam
NA: Numerical aperture

In the instant embodiment, the wavelength λ of the laser beam emitted from the light source 66 is 0.83 μm, and the numerical aperture NA of the object lens 70 is 0.6. Accordingly, the depth of focus δf is calculated as: δf≦0.7 μm. Therefore, when the object lens 70 is positioned at the first position near the memory disk 10, the laser beam from the laser light source 66 is converged on a part of the second storage layer 20 of the memory disk 10, whereby the magneto-optical meterial of the second storage layer 20 is heated beyond its Curie point. Thus, the information stored on the heated part is erased. The recording apparatus further comprises magnetic-field generating means including an electromagnet 74 for producing a magnetic field in a direction perpendicular to the memory disk 10. If a magnetic field is established before the heated beam spot of the second storage layer 20 has been cooled below its Curie point, the cooled beam spot is magnetized in one of the opposite directions perpendicular to the surface of the memory disk 10, depending upon the direction of the magnetic field produced by the electromagnet 74. In this manner, desired information may be written at a desired part or spot (beam spot) of the second storage layer 20 of the memory disk 10. Although the laser beam for erasing the information on the second storage layer 20 is transmitted through the first storage layer 16, the corresponding part of the first storage layer 16 will not be heated above its Curie point, because the depth of focus δf of the object lens 70 is selected to be sufficiently smaller than the thickness of the intermediate non-magnetic layer 18. Thus, the first storage layer 16 is protected against erasure of its information upon erasure of information on the second storage layer 20.

Figure 10:
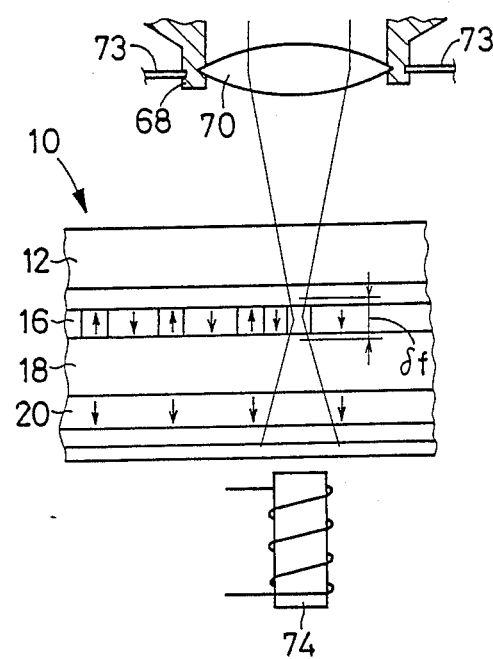
FIG. 10 is a view showing another operating position of the apparatus of FIG. 9.

Upon energization of the coil 71, the object lens 70 is moved to the second position remote from the memory disk 10 as shown in FIG. 10, and the laser beam from the light source 66 is converged on a part of the first storage layer 16 of the memory disk 10. Accordingly, the information recorded on the heated part is erased, and new information may be written thereon, in the same manner as described previously. In this case, too, the laser beam for erasing the information on the first storage layer 16 passes through the second storage layer 20. However, the depth of focus δf of the object lens 70, which is smaller than the thickness of the intermediate non-magnetic layer 18, contributes to preventing the laser beam from heating the corresponding part of the second storage layer 20 to a temperature over its Curie point. Thus, the erasure of the information on the second storage layer 20 is avoided. While the instant recording apparatus is adapted such that the object lens 70 is moved toward and away from the stationary memory disk 10, it is possible that the memory disk 10 is moved with respect to the object lens 70. The linearly polarized light from the light source may be replaced by circularly polarized light, since the laser beam from the light source 66 is used to locally heat the first and second storage layers 16, 20. Further, a monochromic light beam may be substituted for the laser beam from the light source 66.

Modified embodiments of a magneta-optical recording apparatus using object lens or lenses 70 will be described, by reference to FIGS. 11-14.

Figure 11:
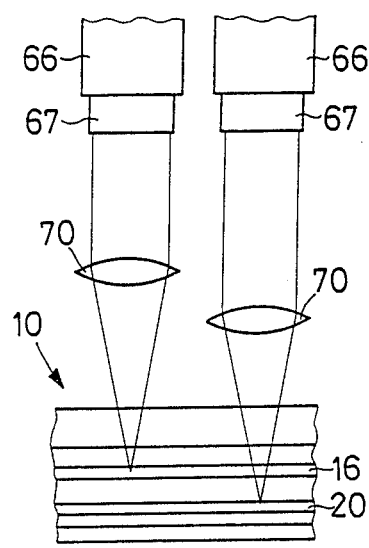
FIGS. 11–14 are schematic views showing respectively further embodiments of the apparatus of the invention for writing information selectively on the storage layers of the memory medium of FIG. 1.

The recording apparatus of FIG. 11 includes a pair of laser light sources 66, 66, and a pair of object lenses 70, 70 for converging the laser beams from the light sources 66, 66, on the first and second storage layers 16, 20, respectively. These two assemblies of the light source 66 and the object lens 70 are disposed at fixed positions relative to the memory disk 10 in the direction perpendicular to the surface of the memory disk 10. This modified embodiment eliminates a drive device for positioning the object lens 70 and the memory disk 10 relative to each other.

Figure 12:
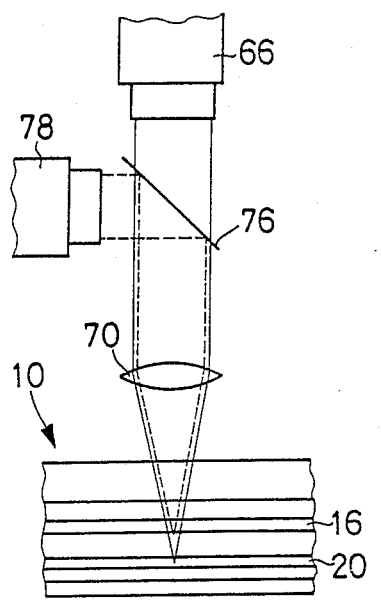

Another modified embodiment is shown in FIG. 12, wherein a second laser beam (parallel pencil rays) from the laser light source 66 is transmitted through a half mirror 76 and the object lens 70, and thus converged on the second storage layer 20. In the meantime, a first laser beam (parallel pencil rays) of a wavelength shorter than that of the first laser beam is produced by another laser light source 78. The first laser beam is reflected by the half mirror 76 and transmitted through the object lens 70, whereby the first laser beam is converged on the first storage layer 16. That is, the focal length of the object lens 70 is changed by means of chromatic aberration. In the present embodiment, the erasing and writing operations of the first and second storage layers 16, 20 may be effected at the same position as viewed in a plane parallel to the memory disk 10. Another advantage of this embodiment is the elimination of a drive device for positioning the object lens 70 relative to the memory disk 10 along the optical axis of the object lens 70.

Figure 13:
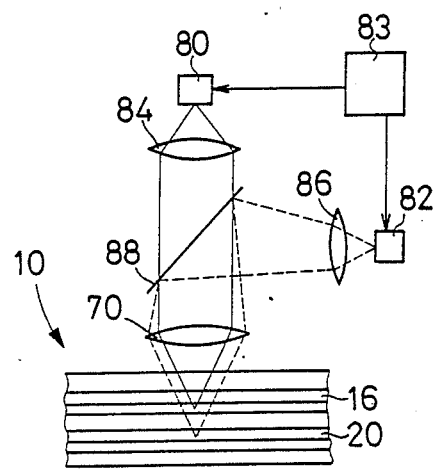

A further modified embodiment is illustrated in FIG. 13, wherein the object lens 70 is positioned stationary with respect to the memory disk 10 in the direction perpendicular to the memory disk. A pair of laser light sources 80, 82, and a pair of collimator lenses 84, 86 are disposed, so that a first laser beam from the light source 80 is transmitted through the collimator lens 84, a half mirror 88 and the object lens 70 and is converged on the first storage layer 16, while a second laser beam from the light source 82 is transmitted through the collimator lens 86, reflected by the half mirror 88, and converged by the object lens 70 on the second storage layer 20 of the memory disk 10. Namely, the laser light sources 80, 82 and the collimator lenses 84, 86 are so positioned that the first and second laser beams generated by the first and second laser light sources 80, 82 are converged on the first and second storage layers 16, 20 of the memory disk 10, respectively. In the present embodiment, the first and second laser beams may have the same or different wavelengths.

In the embodiments of FIGS. 11-13, the two laser beams from the two laser light sources are selectively incident upon the memory disk 10 according to a currently selected circumferential position of the memory disk 10, i.e., while the memory disk 10 is rotated. To this end, for example, shutters 67 as indicated in FIG. 11, or a power switch 83 as indicated in FIG. 13, may be provided for selective application of the two laser beams to the corresponding first and second storage layers 16, 20. The shutters 67 are associated with the light sources 66, 66 to shut one of the laser beams, for allowing application of only one of the laser beams corresponding to one of the first and second storage layers 16, 20 on which information will be written. The power switch 83 selectively activates one of the first and second laser light sources 80, 82 to emit the corresponding laser beam to one of the storage layers 16, 20.

Figure 14:
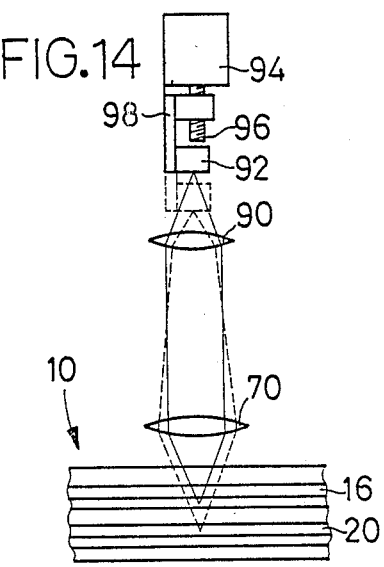

A still further embodiment of a recording apparatus is illustrated in FIG. 14, wherein a collimator lens 90 and the object lens 70 are positioned stationary relative to the memory disk 10 in the direction perpendicular to the disk 10. In this embodiment, a laser light source 92 is adapted to be movable along the optical axis of the object lens 70 so that the laser beam from the light source 92 is converged selectively on the first or second storage layer 16, 20 of the memory disk 10. Described in detail, the light source 92 is attached to a slide 98 which engages a lead screw 96 driven by a stationary drive motor 94. With the screw 96 rotated, the slide 98 is moved parallel to the screw 96, whereby the light source 92 is moved toward or away from the collimator lens 90 and object lens 70, along their optical axes. The slide 98 may be driven by the positioning mechanism 69 of FIG. 9, or by an electrostrictive or magnetostrictive element.

While various embodiments of a magneto-optical recording apparatus of the invention have been illustrated and described, the information recording on the individual storage layers of a magneto-optical memory disk may be effected by a magneto-optical apparatus using a conventional object lens with a relatively large depth of focus, by means of selecting the magneto-optical material of the storage layers of the memory disk.

Figure 15:
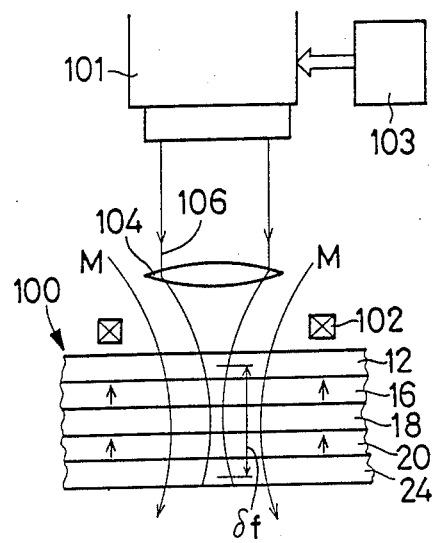
FIGS. 15 and 17 are views of another embodiment of a memory medium of the invention alternative to the memory medium of FIG. 1, and illustrating operations of writing information selectively on the storage layers of the modified memory medium.

There is shown in FIG. 15 a magneto-optical memory disk 100 which, like the memory disk 10, includes the first and second storage layers 16, 20 separated by the intermediate non-magnetic layer 18, the layers 16, 20, 18 being formed on the transparent substrate layer 12. The first and second storage layers 16, 20 are made of magneto-optical materials, the Curie points of which are different from each other. For example, the first storage layer 16 is made of GdDyFe having a Curie point of about 120° C., while the second storage layer 20 is made of GdTbFe having a Curie point of about 150° C. Above the magneto-optical memory disk 100, there are provided a laser light source 101, an annular coil 102 serving as magnetic-field generating means, and an object lens 104, such that these elements 101, 102, 104 are disposed at fixed positions relative to the memory disk 100 in the direction perpendicular to the surface of the disk. Like a conventionally used object lens, the object lens 104 has a relatively large depth of focus δf, so that the corresponding parts of the first and second storage layers 16, 20 are simultaneously heated. In the present embodiment, a laser beam 106 directed to the memory disk 100 through the object lens 104 has a wavelength of 0.83 μm and a numerical aperture NA of 0.45. The depth of focus δf of the object lens 104 is obtained from Equation (9) as ±1.3 μm, that is 2.6 μm. In this case, it is desired that the thickness of the intermediate non-magnetic layer 18 is 2.5 μm or smaller. In the present embodiment, the thickness of the layer 18 is 17830Å.

Figure 16:
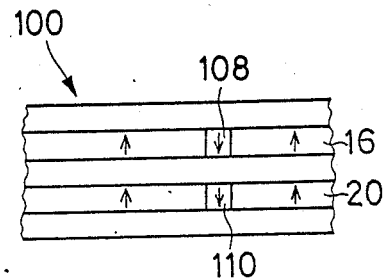
FIGS. 16 and 18 are views showing locations of information written on the storage layers of the memory medium as a result of writing operations of FIGS. 15 and 17, respectively.
Figure 17:
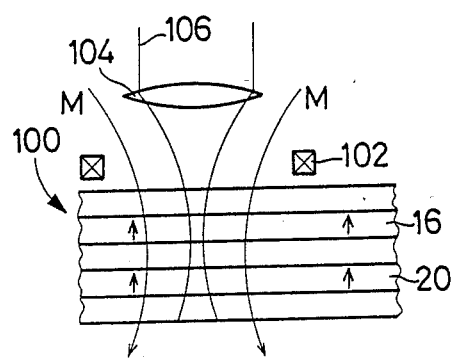
Figure 18:
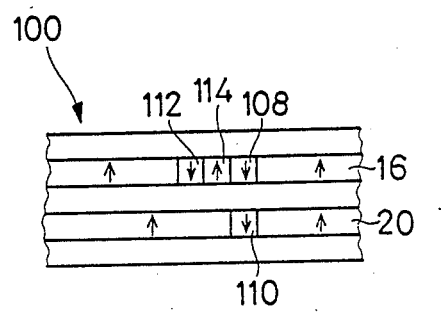

In the apparatus described above, information may be written simultaneously on the first and second storage layers 16, 20 in the following manner. The coil 102 is energized to form a magnetic field in the direction indicated at M in FIG. 15. At the same time, a power source 103 to apply power to the light source 101 is set in its high output position to activate the light source 101, so that the laser beam of high intensity is produced from the light source 101 and directed to the memory disk 100. Consequently, the appropriate parts of the first and second storage layers 16, 20 are heated to a temperature beyond 150° C., for example, whereby the already stored information are erased from the heated parts of the layers 16, 20, and these parts are magnetized in the direction M of the magnetic field. Thus, new information is written on the same parts of the first and second storage layers 16, 20. These newly magnetized parts are indicated at 108 and 110 in FIG. 16. If it is desired to write information only on the first storage layer 16 after the magnetization of the parts 108, 110, the power source 103 is placed in its low output position, so that the intensity of the laser beam 106 incident to the memory disk 100 is reduced. More specifically, the intensity of the laser beam 106 is adjusted so that the temperature of the parts of the storage layers 16, 20 at which the laser beam 106 is converged, is held within a range of 120°-150° C. Accordingly, the appropriate part of the first storage layer 16 is heated to the temperature beyond its Curie point. The intensity of the laser beam 106 may be changed by adjusting an electric current supplied from the power source 103 to the light source 101, or by adjusting a duty cycle of drive pulses applied to the light source 101. However, the output of the light source 101 may be adjusted by changing a filter through which the laser beam 106 passes. In consequence of the heating of the first storage layer 16, the information stored on the heated part is erased, and new information is recorded by magnetization in the direction M of the magnetic field. Reference numeral 112 in FIG. 18 indicates the part on which the new information is written as described above. If the coil 102 in the position of FIG. 17 is energized in the reverse direction, the appropriate part of the first layer 16 is magnetized in the reverse direction, as indicated at 114 in FIG. 18. It will be obvious that information may be written on the first and second storage layers 16, 20 in the above-described manner, even if the Curie point of the first storage layer 16 is higher than that of the second storage layer 20. Further, the memory disk 100 may have three or more magneto-optical storage layers having different Curie points. In this case, too, the information recording on the individual storage layers may be effected in the same manner as described above.

While the present invention has been described by reference to schematic views of the accompanying drawing, it is to be understood that these views are used for illustrating the concept of the invention, and that the invention is not confined to the disclosure of the drawing. While the magneto-optical memory disk 10, 100 is partially shown in cross section in the several figures, the thicknesses of the individual layers of the memory disk as shown are determined for easy understanding of the memory disk. Therefore, a proportion of the thicknesses as shown does not represent a proportion of the actual thicknesses. While only the important optical elements are schematically illustrated in FIGS. 1, 2, 9–15 and 17, it is possible that the illustrated elements are replaced by other functionally equivalent elements, or used together with other optical elements as needed. Further, the two or more elements such as the lens and half mirror may be provided as a single composite element. As typical modifications, the half mirror 76, 88 may be replaced by a dichroic mirror or a polarizing prism, and the dichroic mirror 34, 40 may be replaced by a combination of a half mirror and a filter. In the latter case, however, the operating efficiency of the optical system is slightly reduced.

Although the magneto-optical recording and reading apparatus have been illustrated as separate devices, for easy understanding of the invention, the recording and reading apparatus are generally provided as a single apparatus. The laser light sources used in the illustrated embodiments may be used for both recording and reading operations, if the output capacity of these sources may be increased as required. Therefore, the illustrated magneto-optical reading system may be used for magneto-optical recording operations. As indicated above, the recording apparatus as illustrated include only the elements which are necessary for a magneto-optical recording operation, while the reading apparatus as illustrated include only the elements which are necessary for a magneto-optical reading operation.

While the invention has been described for illustrative purpose only, it will be obvious that various other changes and modifications may be made in the invention, without departing from the spirit of the invention.

What is claimed is:

1. A magneto-optical memory medium, consisting of a laminar structure comprising:
    a plurality of magneto-optical storage layers formed of a magneto-optical material, and including at least a first and a second magneto-optical storage layer;
    a first non-magnetic layer interposed between said first and second magneto-optical storage layers;
    a second non-magnetic layer formed on said second magneto-optical storage layer; and
    a reflector layer formed on said second non-magnetic layer and capable of reflecting a light beam which has passed through said first and second magneto-optical storage layers and said first and second non-magnetic layers,
    information being written on and read from each of said plurality of magneto-optical storage layers, information being written on said first and second magneto-optical storage layers through magnetization thereof in one of opposite directions normal to their surfaces, the information written on said first and second storage layers being read out through detection of changes in the Kerr rotation angles of a first and a second beam of light of different wavelengths applied to the medium, respectively, said Kerr rotation angles of said first and second beams of light being changed depending upon the direction of magnetization of said first and second storage layers,
    one of said first and second magneto-optical storage layers having a thickness determined so that the change in the Kerr rotation angle of a corresponding one of said first and second beams of light represents the direction of magnetization of said one of said first and second storage layers, irrespective of the direction of magnetization of said one of said first and second storage layers, irrespective of the direction of magnetization of the other of said first and second storage layers while the change in the Kerr rotation angle of the other of said first and second beams of light represents the direction of magnetization of said other storage layer, irrespective of the direction of magnetization of said one storage layer.

2. A magneto-optical memory medium according to claim 1, wherein each magneto-optical storage layer consists of a first magneto-optical film having a comparatively low Curie point, and a second magneto-optical film formed in contact with said first magneto-optical film, said second magneto-optical film having a comparatively high magneto-optical effect.

3. A magneto-optical memory medium according to claim 1, wherein said plurality of magneto-optical storage layers have different Curie points.

4. A magneto-optical information recording and reading system, comprising:
    a magneto-optical memory medium having a laminar structure including a first and a second magneto-optical storage layer which are separated from each other by a non-magnetic layer;
    at least one light source for emitting a laser beam toward said memory medium, for writing and reading information on and from each of said first and second magneto-optical storage layers;
    an optical device including an object lens positioned opposite to said memory medium, for converging said laser beam;
    selector means for selecting a focal point of said laser beam on said each of said first and second magneto-optical storage layers of the memory medium;
    magnetic-field generating means for generating a magnetic field to magnetize a part of said each of the first and second magneto-optical storage layers at which said laser beam is converged, in one of opposite directions normal to the surface of said each magneto-optical storage layer, the Kerr rotation angle of said laser beam applied to said each of the first and second magneto-optical storage layers being changed depending upon the direction of magnetization of said each of the first and second magneto-optical storage layers; and
    means for reading the information written on said first and second magneto-optical storage layers, through detection of a change in the Kerr rotation angle of said laser beam applied to said each of the first and second magneto-optical storage layers,
    one of said first and second magneto-optical storage layers having a thickness determined so that the change in the Kerr rotation angle of said laser beam applied to said one of said first and second magneto-optical storage layers represents the direction of magnetization of said one of the first and second magneto-optical storage layers, irrespective of the direction of magnetization of the other of said first and second magneto-optical storage layers while the change in the Kerr rotation angle of said laser beam applied to said other of said first and second magneto-optical storage layers represents the direction of magnetization of said other of the first and second magneto-optical storage layers, irrespective of the direction of magnetization of said one of the first and second magneto-optical storage layers.

5. A magneto-optical apparatus according to claim 4, wherein said at least one light source consists of a single laser light source for emitting a single laser beam, and said selector means comprises positioning means for positioning said object lens relative to the memory medium along an optical axis of said object lens, and thereby positioning the focal point of said single laser beam on said selected storage layer of the memory medium.

6. A magneto-optical apparatus according to claim 4, wherein said at least one light source consists of a plurality of laser light sources for emitting laser beams corresponding to said plurality of storage layers of the memory medium,
    said optical device including a plurality of stationary object lenses positioned opposite to said memory medium and spaced apart from each other along the surface of the memory medium, for converging said laser beams on said plurality of storage layers, respectively, said selector means comprising a shutter device associated with said laser light sources, for allowing only one of said laser light sources corresponding to said selected storage layer of the medium, to emit the corresponding laser light beam therethrough toward the medium.

7. A magneto-optical apparatus according to claim 4, wherein said at least one light source consists of a plurality of laser light sources for emitting laser beams corresponding to said plurality of storage layers of the memory medium, said object lens of the optical device being positioned stationary relative to said memory medium and converging said laser beams on said plurality of storage layers, respectively, at the same position as viewed in a plane parallel to the surface of the storage medium, said selector means comprising a power switch which activates only one of said laser light sources to emit the laser beam corresponding to said selected storage layer of the medium.

8. A magneto-optical apparatus according to claim 4, wherein said at least one light source consists of a single laser light source for emitting a single laser beam, and said selector means comprises positioning means for positioning said single laser light source relative to said object lens along an optical axis of said object lens, and thereby positioning said focal point of said single laser beam on said selected storage layer of the memory medium.

9. A magneto-optical apparatus for recording information on a magneto-optical memory medium which consists of a laminar structure including a plurality of magneto-optical storage layers having different Curie points, and non-magnetic layers respectively interposed between adjacent layers of said plurality of magneto-optical storage layers, said apparatus comprising a laser light source for emitting a laser beam toward said memory medium for writing information on a selected one of said plurality of storage layers, said apparatus further comprising means for changing an intensity of said laser beam so as to heat said storage layers to different temperatures and thereby prepare for effecting the writing of information selectively on said storage layers of the memory medium.

10. A magneto-optical apparatus according to claim 9, wherein said intensity of the laser beam is reduced so as to write the information on the storage layers, in the order of the Curie point magnitudes of the storage layers, beginning with the storage layer having the highest Curie point.

11. A magneto-optical apparatus, comprising:
a laser light source for emitting a laser beam toward a magneto-optical memory medium which consists of a laminar structure including a plurality of magneto-optical storage layers having different Curie points, and non-magnetic layers respectively interposed between adjacent layers of said plurality of magneto-optical storage layers;

an optical device including an object lens for coverging said laser beam on said memory medium so as to heat said storage layers of the memory medium in a direction perpendicular to the surface of the memory medium;

means for changing an intensity of said laser beam so that a temperature of said storage layers is changed between a first level higher than one of the Curie points of the storage layers, and a second level lower than said one of the Curie points; and magnetic-field generating means for generating a magnetic field to magnetize a part of a selected one of the storage layers at which said laser beam is converged, in one of opposite directions normal to the surface of the selected storage layer, said one of the opposite directions representing the information to be written on said part.

12. A magneto-optical information reading system, comprising:

a magneto-optical memory medium which consists of a laminar structure including a first and a second magneto-optical storage layer, a first non-magnetic layer interposed between said first and second magneto-optical storage layers, a second non-magnetic layer formed on said second magneto-optical storage layer, and a reflector layer formed on said second non-magnetic layer, information being written on said first and second magneto-optical storage layers through magnetization thereof in one of opposite directions normal to their surfaces;

means for applying to said first and second magneto-optical storage layers of said memory medium a first laser beam and a second laser beam which have different wavelengths corresponding to said first and second magneto-optical storage layers, respectively, the Kerr rotation angles of said first and second laser beams applied to said first and second storage layers being changed depending upon the direction of magnetization of said first and second storage layers, respectively; and means for reading information from each of said first and second storage layers of the memory medium, based on a change of a corresponding one of said first and second laser beams which occurs due to magneto-optical anisotropy of said each of the first and second storage layers, one of said first and second storage layers having a thickness determined so that the change in the Kerr rotation angle of a corresponding one of said first and second laser beams represents the direction of magnetization of said one of said first and second storage layers, irrespective of the direction of magnetization of the other of said first and second storage layers while the change in the Kerr rotation angle of the other of said first and second laser beams represents the direction of magnetization of said other of the first and second storage layers, irrespective of the direction of magnetization of said one of the first and second storage layers.

13. A magneto-optical information reading system, comprising:

a magneto-optical memory medium having a laminar structure including a first and a second magneto-optical storage layer which are separated from each other by a non-magnetic layer;

an optical system including a first and a second laser light sources which emit a first and a second laser beam of different wavelengths corresponding to said first and second magneto-optical storage layers of said memory medium, said optical system further including means for applying said first and second laser beams, as linearly polarized light beams, to said first and second storage layers of said memory medium, respectively; and detecting means for detecting angles of the Kerr rotation of said first and second laser beams which have been transmitted through or reflected from said first and second storage layers of said memory medium, respectively, and detecting changes in the Kerr rotation angles of the first and second laser beams which occur due to magneto-optical anisotropy of said first and second storage layers of the memory medium, whereby information stored in each of said first and second storage layers is read out by detecting the change in the Kerr rotation angle of the corresponding laser beam, one of said first and second storage layers having a thickness determined so that the change in the Kerr rotation angle of a corresponding one of said first and second laser beams represents the direction of magnetization of said one of said first and second storage layers, irrespective of the direction of magnetization of the other of said first and second storage layers while the change in the Kerr rotation angle of the other of said first and second laser beams represents the direction of magnetization of said other of the first and second storage layers, irrespective of the direction of magnetization of said one of the first and second storage layers.

14. A magneto-optical apparatus for recording information on a magneto-optical memory medium, comprising:

at least one light source for emitting a laser beam toward said memory medium, for writing information on a selected one of a plurality of magneto-optical storage layers which are separated from each other by at least one non-magnetic layer;

an optical device including an object lens positioned opposite said memory medium, for converging said laser beam, said object lens having a depth of focus which is smaller than a thickness of said at least one non-magnetic layer;

selector means for selecting a focal point of said laser beam on said selected one of the storage layers of the memory medium; and magnetic-field generating means for generating a magnetic field to magnetize a part of said selected one of the storage layers at which said laser beam is converged, in one of opposite directions normal to the surface of the selected storage layer, said one of opposite directions representing the information to be written on said part.

15. A magneto-optical information reading system, comprising:

a magneto-optical memory medium which consists of a laminar structure including a first and a second magneto-optical storage layer, a first non-magnetic layer interposed between said first and second magneto-optical storage layer, a second non-magnetic layer formed on said second magneto-optical storage layer, and a reflector layer formed on said second non-magnetic layer;

means for applying to said first and second magneto-optical storage layers of said memory medium a first layer beam and a second layer beam which have different wavelengths corresponding to said first and second magneto-optical storage layers, respectively; and means for reading information from a selected one of said magneto-optical storage layers of the memory medium, based on a change of a corresponding one of said first and second laser beams which occurs due to a change in a direction of magnetization of said selected magneto-optical storage layer, one of said first and second magneto-optical storage layers having a thickness determined so that the change in the Kerr rotation angle of a corresponding one of said first and second means of light represents the direction of magnetization of said one of the first and second magneto-optical storage layers, irrespective of the direction of magnetization of the other of said first and second magneto-optical storage layers.

* * * * *